No. 865,473.  
PATENTED SEPT. 10, 1907.  
W. A. ARTHUR.  
BREAK ARM FOR ELECTRIC WIRING.  
APPLICATION FILED APR. 5, 1907.
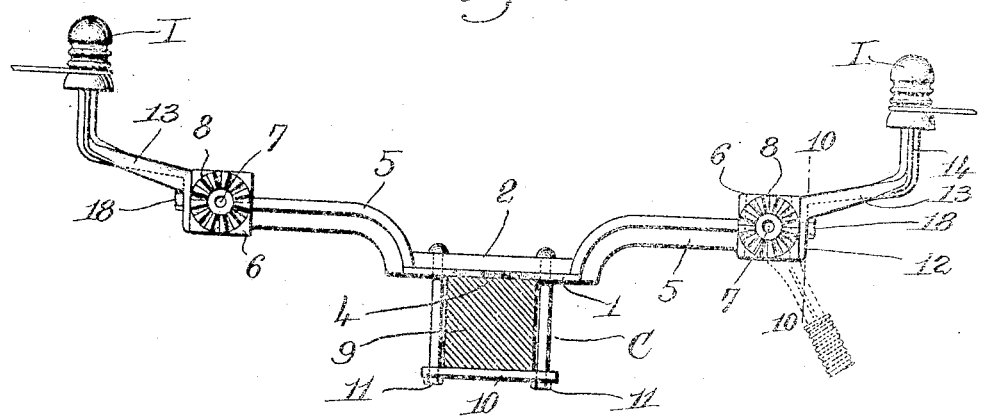
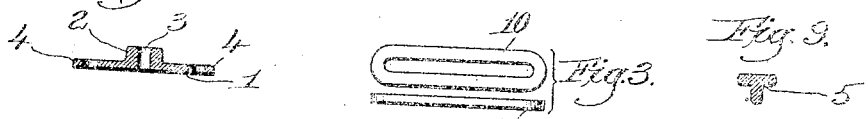
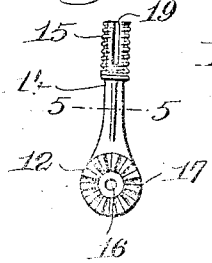
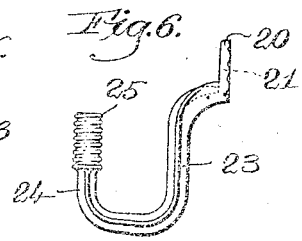
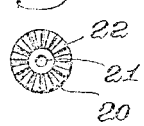
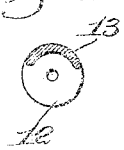
Witnesses.
Thomas J. Drummond
Joseph M. Ward
Inventor.
Walter A. Arthur,
by Crosby Gregory
Attys.

UNITED STATES PATENT OFFICE.

WALTER A. ARTHUR, OF MANCHESTER, NEW HAMPSHIRE.

BREAK-ARM FOR ELECTRIC WIRING.

No. 865,473.  Specification of Letters Patent.  Patented Sept. 10, 1907.

Application filed April 5, 1907. Serial No. 366,523.

*To all whom it may concern:*

Be it known that I, WALTER A. ARTHUR, a citizen of the United States, residing in Manchester, county of Hillsboro, State of New Hampshire, have invented an Improvement in Break-Arms for Electric Wiring, of which the following description, in connection with the accompanying drawing, is a specification, like letters on the drawing representing like parts.

This invention has for its object the production of a novel, simple and efficient break arm for electric wiring, so constructed and arranged that it may be used in various places and positions, such as poles, house walls, cornices, wherever it is necessary to break an electric circuit and securely hold the disconnected ends of the wire.

When a line wire must be broken, as for instance so that a loop can be led therefrom, it is now customary to take a short piece of cable, splice insulators to the ends thereof, and attach the separated ends of the line wire to the insulators, the ends of the loop being led off from the line wire at each side of such break connection. This method is slow and cumbersome, and is the source of much delay in construction work, for whenever a line wire is to be broken the clamps must first be put on, the wire cut, and the insulated cable prepared and applied to the cut ends. Furthermore, the connection must in turn be properly supported on the arm of a pole, or to a bracket on a building or other suitable object.

In my present invention I have provided a break arm made as a casting having opposite branches and adapted to be rigidly secured to a suitable support, and I provide brackets adjustably attachable to the branches and carrying suitable insulators to which are secured the ends of the wire in which the break is made.

The construction is such that an insulator bracket can be adjusted at practically any angle, or set in any desired direction on the branch, and if required more than one bracket may be mounted on each branch, so that a single break arm may be utilized for a plurality of line wires.

The break-arm is so constructed that it can be readily and quickly attached to any suitable or convenient support, in horizontal or vertical position, or reversed, according to the necessities of the case.

The various novel features of my invention will be fully described in the subjoined specification and particularly pointed out in the following claims.

Figure 1 is a side elevation of a break arm embodying one form of my invention, shown as secured to a cross-arm, and with an insulator bracket mounted on each branch; Fig. 2 is a top plan view of the break arm, the insulator brackets being omitted; Fig. 3 is a view in plan and side elevation of the back plate shown in Fig. 1; Fig. 4 is an inner side elevation of one of the insulator brackets, showing its seating face; Fig. 5 is a section on the line 5—5, Fig. 4; Fig. 6 is a side elevation of a drop bracket, to be referred to; Fig. 7 is a plan view of the seating face thereof; Fig. 8 is a transverse section on the line 8—8, Fig. 1, of the base of the break arm; Fig. 9 is a similar section through one of the branches, on the line 9—9, Fig. 1; and Fig. 10 is a section on the line 10—10, Fig. 1, taken through the arm of the insulator bracket adjacent its seating portion.

I make the break arm and insulator brackets as castings, preferably of malleable iron, the break arm comprising an attaching base 1 having a flat under face and a thickened longitudinal portion 2 provided with an elongated slot 3, the base being widened at opposite sides of the part 2 to present apertured ears 4, see Figs. 1 and 2.

Rigid, integral branches 5 extend from the opposite ends of the base, preferably made substantially T-shaped in cross-section, Fig. 9, to secure rigidity and strength combined with relatively light weight, the branches curving upward from the base and then extending substantially in parallelism therewith.

Each branch at its outer end is shaped to present a hollow box-like portion 6, shown herein as substantially cubical, the three outer faces in planes at right angles to the plane of the base 1 having each a central aperture 7. Each of the said faces is designed to form a seat for an insulator bracket, and herein I have shown a series of preferably radial corrugations or ribs 8 arranged around the aperture 7 as a center, such formation being made in casting the break arm. The latter is attached to any suitable support by suitable bolts, the flat under face of the base 1 resting upon the support, and in Fig. 1 I have shown the break arm attached to the cross-bar C of a pole, bolts 9 passing through the slot 3 outside the cross-bar, and through a longitudinally slotted back-plate 10, shown separately in Fig. 3, said back-plate resting against the under side of the cross-bar. The bolts are located at the sides of the latter, so that the break arm can be readily applied without boring bolt-holes, the nuts 11 when set up against the back-plate firmly and rigidly holding the break arm in place.

By means of the slot 3 in the base, and the slotted back-plate 10, the bolts are positioned according to the width of the bar C, being moved inward or outward in the slots as required.

Instead of using such a bar as the support it will be manifest that the break arm can be bolted to a vertical support, such as a building wall, and with the branches extended vertically or horizontally as may be convenient. So, too, by turning the break arm upside down from the position shown in Fig. 1, it can be secured to an overhanging cornice, or to the underside of a crossbar or other support.

If desired the break-arm can be bolted directly to a pole, transversely thereof, without the intervention of a cross-arm, the various modes of supporting the break arm illustrating its adaptability to almost any circumstances arising in construction work.

The branches 5 are designed to form firm and rigid supports for brackets carrying the insulators to which the disconnected ends of the line wire are attached, and I have herein shown a standard bracket, Figs. 1 and 4, and a drop bracket, Fig. 6.

Referring to Figs. 1 and 4, the standard bracket comprises a circular base 12 from which springs at an angle an arm 13, upturned at its extremity at 14 and terminating in a tubular, externally threaded tip 15, see Fig. 4. The base 12 has a central aperture 16 and the seating face is provided with preferably radial corrugations or ribs 17, Fig. 4, concentrically arranged around the aperture 16.

The base of the bracket is connected with the boxlike end 6 of one of the branches 5 by a suitable clamping bolt 18, Fig. 1, which is passed through the apertures 7 and 16 when the same are brought into alinement.

The seating face of the bracket base is brought into contact with the corrugated face of the part 6 of the branch, the radial corrugations 8 engaging the corrugated surface 17 of the bracket base, interlocking the parts so that when the bolt 18 is tightened the bracket cannot turn.

The apertured ears 4 of the base 1 provide additional means for attaching the break arm to a support, or for attaching it in such places that the bolts could not conveniently pass through the slot 3.

It will be readily seen that the bracket can be applied to any one of the three corrugated seats of the part 6 of the branch, and that the bracket can be readily adjusted upon the bolt 18 as a center before the bolt is tightened, thereby giving a wide range of adjustment.

The bracket shown in dotted lines Fig. 1 shows the angular adjustment clearly.

If desired each of the seats may have a bracket clamped thereon, so that the one break arm may hold the disconnected ends of a plurality of line wires.

The insulator I, Fig. 1, is screwed onto the tip 15 of the bracket, and the end of the line wire fastened to the insulator in usual manner, the tip having an expansion slot 19, see Fig. 4.

The detail Fig. 10 shows the circular shape of the bracket base 12 and the cross-sectional shape of the arm 13 adjacent thereto.

In Fig. 6 I have shown a drop bracket, convenient for certain locations, it also having a circular base 20, centrally apertured at 21, Fig. 7, and provided on its seating face with radial corrugations 22, the arm 23 depending from the base in a substantial U-shape and having its upturned portion 24 terminating in a threaded tip 25 for the insulator.

The drop-bracket is secured to the branch of the break arm in the manner just described, and it is angularly adjustable thereon, as set forth.

The device described affords a firm, rigid and strong support and connection for the separated ends of a line wire, or for a "dead end", and as the device can be put in practically any position its range of usefulness is very extended.

In construction work the break arm can be installed very quickly and the line wire cut and attached thereto with a minimum loss of time, each break arm affording as fixed and firm a support for the line ends as do insulators directly secured to cross-arms, buildings, etc.

My invention is not restricted to the precise construction and arrangement as to details herein shown and described, for various changes or modifications therein may be made without departing from the spirit and scope of my invention as set forth in the appended claims.

Having fully described my invention, what I claim as new and desire to secure by Letters Patent is:—

1. A break-arm for electric wiring, comprising an attaching base having rigid branches oppositely extended therefrom, a plurality of bracket-seats on each branch, a bracket adapted to carry an insulator, said bracket having a seating face to engage any one of the seats on a branch, and means to clamp the seating face of the bracket upon the seat in an angularly adjusted position.

2. A break-arm for electric wiring, comprising a casting having an apertured attaching base and rigid branches extended therefrom, a radially corrugated seat on each branch, an insulator bracket having a correspondingly corrugated base to engage the seat, and a clamping bolt extended through the centers of the bracket base and the seat, to clamp the bracket in angularly adjusted position on the branch.

3. A break-arm for electric wiring, comprising a cast-metal attaching base having rigid branches extended therefrom, a roughened seat on the outer end of each branch, an insulator bracket detachably mounted on the seat an adjustable angularly thereon, said bracket having a roughened face to engage the seat, and a device to clamp the face of the bracket upon the seat in such adjusted position.

4. A break-arm for electric wiring, comprising a flat cast-metal attaching base provided with bolt-receiving openings, rigid branches extended oppositely from the base, a plurality of bracket-seats on the outer end of each branch, an insulator bracket having a seating face, and means to clamp the seating face of the bracket upon one of the seats on the branch.

5. A break-arm for electric wiring, comprising a flat cast-metal attaching base provided with bolt-receiving openings, rigid branches extended oppositely from the base, each branch having a box-like outer end provided with radially corrugated faces to form bracket seats, insulator brackets mounted on the branches, each bracket having a radially corrugated seating portion to coöperate with one of the bracket seats, and a clamp bolt extended through the centers of the opposed seat and the seating portion of the bracket, the bracket being angularly adjustable on the seat and being held by the corrugations in adjusted position when the clamp bolt is tightened.

6. A break-arm for electric wiring, comprising a flat cast-metal attaching base provided with bolt-receiving openings, rigid branches extended oppositely from the base, a plurality of centrally apertured and radially corrugated seats on the outer end of each branch, brackets having correspondingly corrugated and apertured portions to rest upon the seats, and clamping bolts passed through the apertures to clamp a bracket on the seat, said brackets having insulator-carrying arms.

7. A break-arm for electric wiring, comprising a flat cast-metal base having a longitudinal slot and lateral, apertured ears, rigid branches extended oppositely from the base, an apertured, roughened seat on the outer end of each branch, an insulator bracket having a roughened face to engage the seat, and a clamping bolt extended through the said face and through the seat aperture to clamp the bracket on the branch, the bracket being angularly adjustable on the seat.

8. A break-arm for electric wiring comprising a flat cast-metal base having a longitudinal bolt-receiving slot extending from end to end thereof and rigid branches extended oppositely from the base, insulator brackets connected with the branches, a slotted flat back-plate, and bolts adapted to pass through the slots of the base and back-plate at opposite sides of a cross-bar, to rigidly connect the break-arm thereto, the slots permitting adjustment of the bolts to conform to different widths of a cross-arm.

In testimony whereof, I have signed my name to this specification, in the presence of two subscribing witnesses.

WALTER A. ARTHUR.

Witnesses:
 GEO. W. GREGORY,
 EMILY C. HODGES.